Figure 1:
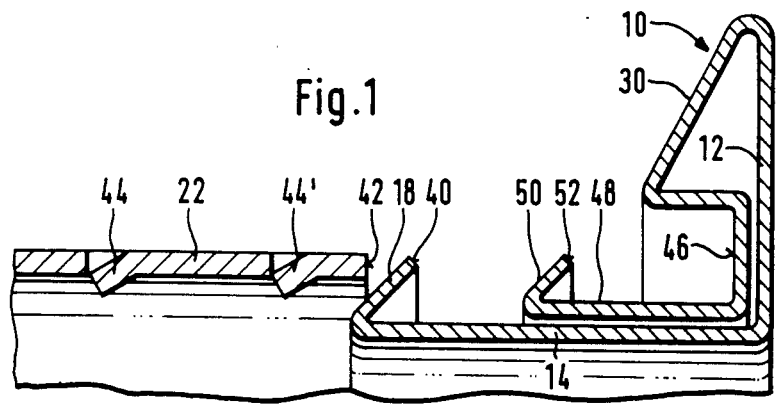

United States Patent [19]

Meinig

[11] Patent Number: 4,679,832
[45] Date of Patent: Jul. 14, 1987

[54] FLANGE RING FOR PIPES

[76] Inventor: Manfred Meinig, Seitinger Strasse 186, D-7201 Rietheim-Weilheim 2, Fed. Rep. of Germany

[21] Appl. No.: 855,322

[22] Filed: Apr. 24, 1986

[30] Foreign Application Priority Data

May 2, 1985 [DE] Fed. Rep. of Germany ....... 3515737

[51] Int. Cl.⁴ ............................................. F16L 23/00
[52] U.S. Cl. .................................. 285/414; 285/319; 285/424; 285/921
[58] Field of Search ............... 285/414, 424, 320, 319, 285/921

[56] References Cited

U.S. PATENT DOCUMENTS 4,304,423 12/1981 Mez ................................. 285/319 X
4,566,724 1/1986 Arnoldt ........................... 285/424 X

FOREIGN PATENT DOCUMENTS 2434160 1/1976 Fed. Rep. of Germany ...... 285/424

Primary Examiner—Richard J. Scanlan, Jr.
Attorney, Agent, or Firm—Leonard Bloom

[57] ABSTRACT

A one-piece flange ring for mounting in an open pipe includes a flange, an outer and an inner leg projecting from the flange, and an outer and an inner annularly projecting land for engaging the inner wall of the pipe. The outer leg is closer to the inner wall of the pipe than the inner leg when installed in the pipe. The outer and the inner leg are substantially parallel to one another and a capable of being fixed under stress with respect to the flange by the inner wall of the pipe when the legs are driven into the open pipe. The outer and the inner pipe engaging lands have an outer diameter greater than the inner diameter of the pipe before installation in the pipe, and they are flexed under stress toward the center of the pipe when the flange ring is installed in the pipe. The outer and the inner pipe engaging lands have an outer diameter equal to the inner diameter of the pipe after installation in the pipe. The outer and the inner pipe engaging lands are bent diagonally toward the flange. The flange includes two parallel faces, an outer face and an inner face. The outer face projects substantially perpendicular from the outer leg. The inner face projects substantially perpendicular from the inner leg.

13 Claims, 3 Drawing Figures

FLANGE RING FOR PIPES

The invention relates to a flange ring installed on the end of a pipe.

A flange ring of this type is disclosed in German Patent No. 31 43 893. With normal stress, it is completely stable in the pipe end, since the ring land, driven in under initial stress, struts itself strongly enough on the inner wall of the pipe. However, if strong bending strains occur, then it is desirable to further reinforce the cohesion of the flange ring in the pipe end.

Such an additional stabilization of the flange ring in the pipe end is attained as a result of the invention.

With a flange ring of the above-mentioned type, this object is solved by employing the principles of the invention. The flange ring of the invention is characterized in having an inner leg, an outer leg folded over the inner leg, and a projection which projects from the outer leg to the interior of the pipe. The projection can be annular.

The cohesion of the flange ring in the pipe end can thereby be practically doubled. Manufacture and assembly of the flange ring become, however, only negligibly more complicated due to these measures.

The annular projection can either be pressed outward from the second leg, so that it abuts against the inner wall of the pipe from the inside under initial stress. According to a preferred embodiment the annular projection consists of a second ring land, which is bent in the same manner as the first ring land and whose outer edge struts itself against removal from the pipe under initial stress.

To further reinforce the cohesion of the flange ring in the pipe end, the first and/or second ring land can, be snapped in behind each of a rim of support projections, which extend inward from the inner surface of the pipe. For practical purposes, the support projections consist of cams, which are pressed inward from the pipe wall.

Embodiments of the invention are described in greater detail with reference to the drawings, showing FIG. 1. an axial partial section through a pipe end with the flange ring prior to mounting on the pipe end, FIG. 2. the parts shown in FIG. 1 after mounting of the flange ring, and FIG. 3. a partial section corresponding to FIG. 2 with a second embodiment of the flange ring.

Similar or corresponding parts are designated with the same reference number throughout patent.

The flange ring, generally designated with 10, has a radial mounting flange or inner face, a first leg or inner leg 14, approximately at right angles to it, that is, extending approximately axially, and a first ring land or inner pipe engaging land 18 bent diagonally outward from the leg 14 toward the mounting flange 12. In the no-load condition of the flange ring 10, shown in FIG. 1, the largest diameter of the first ring land 18 is larger at its outer edge 40 than the inside diameter of the pipe 22, into whose open end 42 the flange ring 10 is to be driven in under initial stress of the first ring land 18, as can be seen in FIG. 2.

While driving in, the outer edge 40 glides along the inner wall of the pipe 22 until it snaps in behind a rim of for support projections 44, which are pressed inward in the form of cams from the wall of pipe 22. As a result of the longer construction of the first leg 14, the tolerance of the distance of the support projections 44 from the open pipe end 42 is not particularly critical which, in particular, represents a considerable facility with inaccurate cutting of the pipe at the construction site.

A clamp part 30, bent over by more than 90° to the same axial side as leg 14, is provided at the outer end of the mounting flange 12, a part 46, coming to rest at the mounting flange 12, connects to the end of said clamp part 30 for a better reinforcement of the flange ring 10, said part 46, in turn, turns into a second leg or outer leg 48 which comes to rest at the first leg 14 and serves for an additional reinforcement. A second ring land or outer pipe engaging land 50, bent diagonally toward the mounting flange 12, proceeds from the second leg 48 for additional bracing at the inner wall of the pipe, similar to the first ring land 18. The second leg 48 is made shorter in this embodiment than the first leg 14, so that the outer edge 52 of the second ring land 50 braces itself at the inner wall of the pipe 22 outside of the support projections 44. A second rim of support projections 44' or near support projections is provided, behind which the outer edge 52 snaps in for an additional securing of the flange ring 10.

Figure 2:
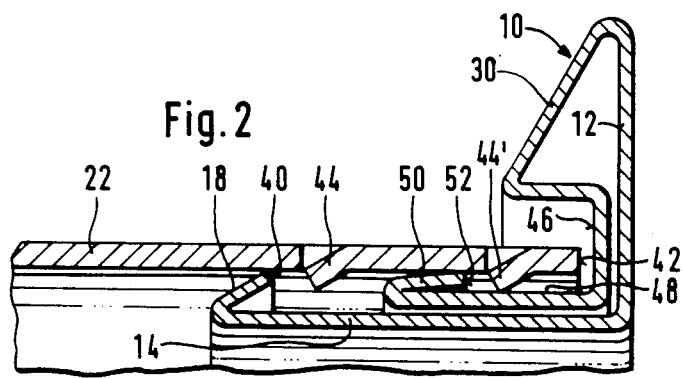
Figure 3:
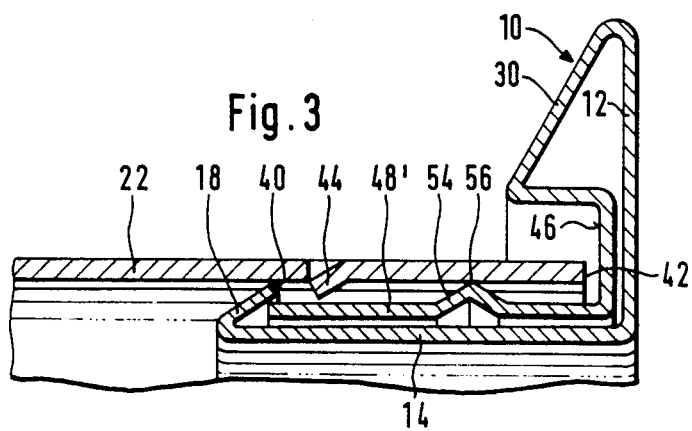

In the embodiment according to FIG. 3, most of the parts are constructed essentially the same as in the embodiment shown in FIGS. 1 and 2. The same reference numbers are, therefore, used herefor. In this embodiment, the second leg 48 is simply made almost as long as the first leg 14 and, thus, abuts over almost the entire length of said first leg in a propping manner against this first leg. Instead of a second ring land, a reinforcing seam 54, bracing itself on the inner wall of the pipe and pressed radially outward, is provided, the outer edge 56 of said reinforcing seam 54 also braces itself under initial stress on the inner wall of the pipe 22 while being driven into the open end 42 of the pipe 22.

I claim:

1. A flange ring for mounting in an open pipe, said flange ring comprising:
    flange means,
    outer and inner leg means projecting from said flange means, said outer leg means closer to the inner wall of the pipe than said inner leg means when installed in the pipe, said outer and inner leg means being substantially parallel to one another and capable of being flexed under stress with respect to said flange means by the inner wall of the pipe when said leg means are driven into the open pipe,
    outer and inner pipe engaging means inserted inside the pipe, said outer pipe engaging means projecting from said outer leg means toward the inner wall of the pipe when installed in the pipe, said inner pipe engaging means projecting from said inner leg means toward the inner wall of the pipe when installed in the pipe.

2. The flange ring described in claim 1 wherein said flange ring is a one-piece structure.

3. The flange ring described in claim 1 wherein said outer and inner pipe engaging means are annular projections.

4. The flange ring described in claim 1, wherein:
    said outer and inner pipe engaging means have an outer diameter greater than the inner diameter of the pipe before installation in the pipe;
    said outer and inner leg means are flexed toward the center of the pipe when the flange ring is inserted in the pipe, and
    said outer and inner pipe engaging means have an outer diameter equal to the inner diameter of the pipe after installation in the pipe.

5. The flange ring described in claim 1 wherein said outer and inner pipe engaging means are bent diagonally toward said flange means.

6. The flange ring described in claim 1 wherein said outer pipe engaging means is longer than said inner pipe engaging means and wherein the ends of both outer and inner pipe engaging means lie in a cylinder substantially coaxial with the pipe.

7. The flange ring described in claim 1 wherein said flange means includes two parallel faces, an outer face and an inner face, said outer face projecting substantially perpendicular from said outer leg means, said inner face projecting substantially perpendiculary from said inner leg means.

8. The flange ring described in claim 1 wherein said outer pipe engaging means is comprised of a formed seam in said outer leg means.

9. The flange ring described in claim 1 wherein said outer leg means extends along said inner leg means, the edge of said outer leg means located under said inner pipe engaging means.

10. A pipe and flange ring assembly, comprising:
a flange ring described in claim 1,
a pipe having far support projection means for engaging said said inner pipe engaging means.

11. A pipe and flange ring assembly, comprising:
a flange ring described in claim 1,
a pipe having near and far support projection means, said near projection means for engaging said outer pipe engaging means, and said far support projection means for engaging said inner pipe engaging means.

12. A one-piece flange ring for mounting in an open pipe, said flange ring comprising:
flange means,
outer and inner leg means projecting from said flange means, said outer leg means closer to the inner wall of the pipe than said inner leg means when installed in the pipe, said outer and inner leg means being substantially parallel to one another and capable of being flexed under stress with respect to said flange means by the inner wall of the pipe when said leg means are driven into the open pipe,
outer and inner annularly projecting pipe engaging means inserted inside the pipe, said outer pipe engaging means projecting from said outer leg means toward the inner wall of the pipe when installed in the pipe, said inner pipe engaging means projecting from said inner leg means toward the inner wall of the pipe when installed in the pipe, said outer and inner pipe engaging means have an outer diameter greater than the inner diameter of the pipe before installation in the pipe, said outer and inner leg means being flexed under stress toward the center of the pipe when the flange ring is installed in the pipe, said outer and inner pipe engaging means having an outer diameter equal to the inner diameter of the pipe after installation in the pipe, said outer and inner pipe engaging means being bent diagonally toward said flange means,
said flange means including two parallel faces, an outer face and an inner face, said outer face projecting substantially perpendiculary from said outer leg means, said inner face projecting substantially perpendiculary from said inner leg means.

13. A flange ring for mounting in an open pipe, said flange ring comprising:
flange means,
outer and inner leg means projecting from said flange means, said outer leg means closer to the inner wall of the pipe than said inner leg means when installed in the pipe, said outer and inner leg means being substantially parallel to one another and capable of being flexed under stress with respect to said flange means by the inner wall of the pipe when said leg means are driven into the open pipe,
outer and inner pipe engaging means inserted inside the pipe, said outer pipe engaging means projecting from said outer leg means toward the inner wall of the pipe when installed in the pipe, said inner pipe engaging means projecting from said inner leg means toward the inner wall of the pipe when installed in the pipe, said outer and inner pipe engaging means have an outer diameter greater than the inner diameter of the pipe before installation in the pipe, said outer and inner leg means being flexed under stress toward the center of the pipe when the flange ring is installed in the pipe, said outer and inner pipe engaging means having an outer diameter equal to the inner diameter of the pipe after installation in the pipe, said outer pipe engaging means being comprised of a formed seam in said outer leg means, said outer leg means extending along said inner leg means, the edge of said outer leg means located under said inner pipe engaging means.

* * * * *